United States Patent [19]
Botros

[11] Patent Number: 5,730,789
[45] Date of Patent: Mar. 24, 1998

[54] WATERFAST INFRARED SCANNABLE INKS FOR INK JET PRINTING

[75] Inventor: Raouf Botros, Centerville, Ohio

[73] Assignee: Scitex Digital Printing, Inc., Dayton, Ohio

[21] Appl. No.: 681,806

[22] Filed: Jul. 29, 1996

[51] Int. Cl.$^6$ .................................. C09D 11/02
[52] U.S. Cl. ........................ 106/31.43; 106/31.27
[58] Field of Search ................. 106/22 H, 20 D, 106/31.43, 31.27

[56] References Cited

U.S. PATENT DOCUMENTS

| | | | |
|---|---|---|---|
| 4,267,088 | 5/1981 | Kempf | 106/22 H |
| 4,659,382 | 4/1987 | Kang | 106/22 H |
| 4,789,400 | 12/1988 | Solodar et al. | 106/22 H |
| 5,017,224 | 5/1991 | Tomita et al. | 106/22 H |
| 5,017,644 | 5/1991 | Fukker et al. | 106/22 H |
| 5,223,028 | 6/1993 | Aulick et al. | 106/22 H |

*Primary Examiner*—Helene Klemanski
*Attorney, Agent, or Firm*—Barbara Joan Haushalter

[57] ABSTRACT

An ink jet ink composition comprises a liquid vehicle, a dye, a hydroxyalkylated polyethyleneimine, and an ammonium salt for enhancement of waterfastness. The ammonium salt preferably comprises less than 1% by weight of the ink composition, and is added to a combination of the dye and ethoxylated polyethyleneimine. The ink jet ink composition increases the waterfastness of the ink to a level greater than 85%.

13 Claims, No Drawings

WATERFAST INFRARED SCANNABLE INKS FOR INK JET PRINTING

TECHNICAL FIELD

The present invention relates to aqueous liquid inks which are waterfast when applied and, more particularly, to enhancement in waterfastness of ink jet inks by adding specific ammonium salts to the ink.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

In the ink jet printing art, water soluble dyes are desirable for runnability. However, waterfast inks are highly desirable for producing permanent images. Decreasing the solubility of the dye increases the waterfastness, and vice versa. Achieving improvement in waterfastness of ink jet inks remains a top priority. A waterfast ink is highly desired for publishing and documentation, including in the lottery industry, to prevent alteration of information on such documents.

In commonly assigned U.S. patent Ser. No. 08/443,932, filed May 18, 1995, totally incorporated herein by reference, enhancement in waterfastness of ink jet inks was achieved by adding specific water soluble organic solvents to the ink. However, achieving improvement in waterfastness and darkness of ink jet inks remains a top priority. Significant improvement in water resistance and darkness of the image is necessary in the business of publishing, bar codes, business forms and lottery industries. The use of hydroxyalkylated polyethyleneimine in ink jet inks showed significant improvement in waterfastness from a range of 40–60% to a range of 70–95% depending on the substrate and the dye in the ink. Unfortunately, sulfur black dyes which are normally used in ink jet inks for infrared (IR) scannability achieve only modest improvement in water resistance with ethoxylated polyethyleneimine (EPI), probably due to its extreme solubility. Therefore, an ink which contains 3.5% Direct Black 19, 1% Sulfur Black 2, and 4% EPI showed waterfastness of only 55% on 80 lbs. coated substrate. In absence of the sulfur black dye, waterfastness is 92% on the same substrate. Therefore, it becomes a challenge to achieve waterfastness and IR scannability simultaneously in an aqueous dye base ink.

It is seen then that there is a need for improved waterfastness of dark inks for use in ink jet recording equipment.

SUMMARY OF THE INVENTION

This need is met by the waterfast ink composition according to the present invention, wherein enhancement in waterfastness and darkness of ink jet inks is achieved by adding a specific percentage of specific ammonium salts to a combination of dye and ethoxylated polyethyleneimine.

In accordance with one embodiment of the present invention, an ink composition comprises a liquid vehicle, a dye, a hydroxyalkylated polyethyleneimine, and an ammonium salt for enhancement of waterfastness. The ammonium salt preferably comprises less than 1% by weight of the ink composition, and is added to a combination of the dye and ethoxylated polyethyleneimine. The ink composition preferably comprises 1–2% by weight of the ethoxylated polyethyleneimine.

Other objects and advantages of the invention will be apparent from the following description and the appended claims.

DETAILED DESCRIPTION OF THE INVENTION

It has heretofore been observed that the best running inks are those of very water soluble components which are free of any water dispersible polymers or resins. Such polymeric materials tend to concentrate in inks and on orifices, and this may lead to their premature curing or interaction with other components in the ink to form an insoluble derivative of the dye. Normally, it is preferred that this insoluble formation happens on the substrate upon drying of the image and not while the ink is circulating in the printer.

The ink jet ink composition of the present invention comprises a liquid vehicle, a dye, a hydroxyalkylated polyethyleneimine, and an ammonium salt. In U.S. Pat. No. 5,223,028 disclosed a waterfast ink having black food dye, hydroxyethylated polyethyleneimine and 10% by weight ammonium benzoate. However, as seen in the Examples below, when 10% by weight ammonium benzoate was used in the present invention, the ink precipitated out and particle size increased from 0.05 micron (Example II—before addition of the ammonium salt) to 2.75 microns (Example XI—after the addition of 10% by weight ammonium benzoate). The optical density also dropped from 2.2 to 1.2 due to dye precipitation. Furthermore, the use of a smaller amount of ammonium benzoate, such as 1% by weight, was actually discouraged in the '028 patent, due to insufficient waterfastness. Another ammonium salt claimed in the '028 patent is ammonium chloride. However, this salt showed serious heat instability even when it comprised less than 1% by weight of the ink.

In accordance with the present invention, the addition of less than 1% by weight ammonium sulfate to an ink which comprises one or more dyes such as Direct Black 19 (DB-19) and Sulfur Black 2, and also comprises a polymer such as a hydroxyalkylated polyethyleneimine, and particularly ethoxylated polyethyleneimine (EPI), improved water resistance of the ink considerably, as demonstrated in the Examples below.

In a preferred embodiment of the present invention, the ink composition is a waterfast, IR scannable ink. The ink composition comprises a liquid vehicle, a dye, a hydroxyalkylated polyethyleneimine, and an ammonium salt for enhancement of waterfastness. The ink composition preferably comprises less than 1% by weight of specific ammonium salts such as ammonium sulfate, ammonium nitrate, and ammonium citrate.

The liquid vehicle in the ink jet ink composition of the present invention comprises an amine, preferably alkyl- and alkanol-substituted amines such as dimethylethanolamine, triethanolamine, diethylethanolamine and the like. Other additives that are optionally included in the vehicle of the invention include a corrosion inhibitor in an amount from 0 to 0.2 wt. % such as an alkanolamine; and a wetting agent of from 0 to 1 wt. %, such as an ethoxylated glycol ether; and a lower alphatic alcohol having one hydroxy group and up to five carbon atoms in a straight or branched chain in an amount of 0 to 10 wt. %; and a biocide from 0 to 0.5 wt. % such as dehydroacetic acid. The ink may also include an optional defoamer such as phosphate esters, silicone or non-silicone defoamer or acetylenic diol.

The dye in the ink jet ink composition of the present invention is water soluble and preferably selected from the group consisting of direct dyes, acid dyes, food dyes and reactive dyes. In general, the concentration of the dye should be between about 1% and 4% by weight.

In accordance with the present invention, any suitable dyes may be used to prepare the dye concentrate which can be used to formulate IR scannable ink, including commercially available black dyes such as Sulphur Black 2 and Direct Black 19 (DB-19), and various other dyes and combinations of dyes. The following Examples list ink formulations comprising varying percentages of ammonium salt and the effect on waterfastness.

EXAMPLE I

Preparation of Dye Concentrate

| | |
|---|---|
| 10% Liquid DB-19 | 700.00 g |
| 11.5% Liquid Sulphur Black 2 | 230.00 g |
| Dimethylamino Ethanol (DMAE) | 16.00 g |
| Deionized water | 687.80 g |
| Corrosion Inhibitor | 2.00 g |
| Biocide | 2.00 g |
| Surfactant | 2.00 g |
| Defoamer | 0.20 g |
| 18% EPI | 160.00 g |

| | Example II | Example III | Example IV |
|---|---|---|---|
| Concentrate from Ex. 1 | 90.0 g | 90.0 g | 90.0 g |
| Deionized Water | 10.0 g | 9.8 g | 9.6 g |
| Ammonium Sulfate | — | 0.2 g | 0.4 g |
| Optical Density | 2.2 | 2.4 | 2.4 |
| Waterfastness (% Retention) | 55% | 59% | 81% |
| Particle Size, Fresh Ink (Micron) | 0.05 | 0.05 | 0.05 |
| Particle Size, 70° C./1 wk. Ink (Micron) | 0.05 | 0.05 | 0.05 |
| pH | 10.06 | 9.87 | 9.75 |

| | Example V | Example VI |
|---|---|---|
| Concentrate from Ex. 1 | 90.0 g | 90.0 g |
| Deionized Water | 9.4 g | 9.2 g |
| Ammonium Sulfate | 0.6 g | 0.8 g |
| Optical Density | 2.4 | 2.4 |
| Waterfastness (% Retention) | 87% | 90% |
| Particle Size, Fresh Ink (Micron) | 0.05 | 0.06 |
| Particle Size, 70° C./1 wk. Ink (Micron) | 0.08 | 0.14 |
| pH | 9.64 | 9.58 |

Drawdowns of the inks made by Examples II through VI on Consolith Gloss 80 lbs. substrates showed improvement in waterfastness from 55% of the ink in Ex. II (no ammonium sulfate) to 90% of the ink in Ex. VI which contains 0.8% by weight ammonium sulfate. It seems that improvement in waterfastness tends to level off beyond 0.6% by weight ammonium sulfate. In order to test the heat stability of the inks which contains ammonium sulfate, the particle size of the fresh inks were measured before and after the inks were kept at 70° C. for one week. The values as indicated above show that the inks are stable. There was a slight growth in particle size to 0.14 micron of the ink which contains 0.8% by weight ammonium sulfate. However, this value is well below 0.45 micron requirement for filtration of the ink.

It was unexpected to see improvement in darkness of drawdowns of the inks which contained ammonium sulfate. The optical densities increased from 2.2 of the ink which had no ammonium sulfate to 2.4 for the inks which contained the ammonium salt. The difference in optical density is significant due to increased demands for darker and permanent prints in publishing and addressing.

In the following Examples, other ammonium salts have been investigated to see if they have an effect on waterfastness similar to that of ammonium sulfate. Example V has been repeated, except that in place of 0.6% by weight ammonium sulfate, 0.6% by weight of a different ammonium salt was used. Salts tried were ammonium chloride, ammonium citrate tribasic, ammonium nitrate, ammonium benzoate and ammonium acetate, as listed in Examples VII through XII. Results of optical density, waterfastness, and particle size of the inks before and after aging at 70° C. for one week are also listed below.

| | Example VII | Example VIII | Example IX |
|---|---|---|---|
| Concentrate from Ex. 1 | 90.0 g | 90.0 g | 90.0 g |
| Deionized Water | 9.4 g | 9.4 g | 9.4 g |
| Ammonium Chloride | 0.6 g | — | — |
| Ammonium Citrate Tribasic | — | 0.6 g | — |
| Ammonium Nitrate | — | — | 0.6 g |
| Ammonium Benzoate | — | — | — |
| Ammonium Acetate | — | — | — |
| Optical Density | 2.3 | 2.2 | 2.2 |
| Waterfastness (% Retention) | 90% | 85% | 92% |
| Particle Size, Fresh Ink (Micron) | 0.05 | 0.05 | 0.05 |
| Particle Size, 70° C./1 wk. Ink (Micron) | 2.75 | 0.07 | 0.07 |
| pH | 9.54 | 9.72 | 9.66 |

| | Example X | Example XI | Example XII |
|---|---|---|---|
| Concentrate from Ex. 1 | 90.0 g | 90.0 g | 90.0 g |
| Deionized Water | 9.4 g | — | 9.4 g |
| Ammonium Chloride | — | — | — |
| Ammonium Citrate Tribasic | — | — | — |

-continued

| | | | |
|---|---|---|---|
| Ammonium Nitrate | — | — | — |
| Ammonium Benzoate | 0.6 g | — | — |
| Ammonium Benzoate | — | 10 g | — |
| Ammonium Acetate | — | — | 0.6 g |
| Optical Density | 2.1 | 1.2 | 2.3 |
| Waterfastness (% Retention) | 89% | 95% | 89% |
| Particle Size, Fresh Ink (Micron) | 0.05 | 2.75 | 0.05 |
| Particle Size, 70° C./1 wk. Ink (Micron) | 0.05 | 2.75 | 0.07 |
| pH | 9.81 | 9.06 | 9.69 |

In general, addition of 0.6% by weight other ammonium salts behaved similar to ammonium sulfate in waterfastness. However, in the case of ammonium chloride, there was a significant increase in particle size from 0.05 micron to 2.75 microns after heating the ink for one week at 70° C. Obviously, the ink failed the 0.45 micron filtration test requirements. The same phenomenon was observed when 10% by weight ammonium benzoate was used in Example XI instead of 0.6% by weight, as used in Example X. Again, the ink showed instability, as demonstrated by an increase in particle size from 0.05 microns to 2.75 microns after the ink was heated at 70° C. for one week. A possible explanation may be due to lower pH of the ink (approx. 9.5 and 9.0) compared to pH of the other inks ≧9.7. It is known that the cationic character of EPI increases as the pH drops, and it is possible that in the case of the ammonium chloride ink that EPI acquires more cationic charge to react with the anionic dye when the ink is heated at 70° C.

This discovery becomes even more valuable when dealing with non-black dyes. In general, yellows, reds and blues are more water soluble dyes due to their generally smaller molecules, therefore, it becomes a challenge to make them waterfast.

When the ink compositions were formulated as above in accordance with the present invention, the resultant ink was used in a continuous ink jet printer, such as the type manufactured by Scitex Digital Printing, Inc., in Dayton, Ohio, to test its waterfastness. The prints generated using the ink formulated in accordance herewith achieved the optical density and waterfastness indicated above, after soaking in water for approximately one minute. The dye in the ink jet ink composition according to the present invention decreases the solubility of the ink and, therefore, can be used to formulate waterfast black and color inks for ink jet printers.

INDUSTRIAL APPLICABILITY AND ADVANTAGES

The present invention is useful in the field of ink jet printing, and has the advantage of formulating an ink jet ink composition for use in ink jet printing which has decreased solubility and increased waterfastness. The present invention provides the further advantage of improving IR scannability, which is highly desirable for ink jet printing to produce water resistant bar codes and other markings.

The invention has been described in detail with particular reference to certain preferred embodiments thereof, but it will be understood that modifications and variations can be effected within the spirit and scope of the invention.

I claim:

1. An ink jet ink composition comprising a liquid vehicle, a dye, a hydroxyalkylated polyethyleneimine, and an ammonium salt in an amount of less than 1% by weight for enhancement of waterfastness.

2. An ink jet ink composition as claimed in claim 1 wherein the ammonium salt comprises ammonium sulfate.

3. An ink jet ink composition as claimed in claim 2 having increased optical density.

4. An ink jet ink composition as claimed in claim 1 wherein the ammonium salt comprises ammonium citrate.

5. An ink jet ink composition as claimed in claim 1 wherein the ammonium salt comprises ammonium nitrate.

6. An ink jet ink composition as claimed in claim 1 wherein the ammonium salt comprises ammonium benzoate.

7. An ink jet ink composition as claimed in claim 1 wherein the ammonium salt comprises ammonium acetate.

8. An ink jet ink composition as claimed in claim 1 wherein the hydroxyalkylated polyethyleneimine comprises ethoxylated polyethyleneimine.

9. An ink jet ink composition as claimed in claim 2 wherein the ink comprises 1-2% by weight ethoxylated polyethyleneimine.

10. An ink jet ink composition as claimed in claim 1 wherein waterfastness of the ink is greater than 85%.

11. An ink jet ink composition as claimed in claim 1 wherein the dye comprises Sulphur Black 2.

12. An ink jet ink composition as claimed in claim 1 wherein the dye comprises Direct Black 19.

13. An ink jet ink composition as claimed in claim 1 wherein the dye is IR scannable.

* * * * *